United States Patent
Park et al.

(10) Patent No.: US 11,755,386 B2
(45) Date of Patent: *Sep. 12, 2023

(54) SYSTEMS AND METHODS FOR MANAGING APPLICATION PROGRAMMING INTERFACE INFORMATION

(71) Applicant: Coupang Corp., Seoul (KR)

(72) Inventors: Young Jin Park, Guri (KR); Yong Hyun Yoon, Gwangju (KR); Won Suk Yang, Seoul (KR)

(73) Assignee: Coupang Corp., Seoul (KR)

( * ) Notice: Subject to any disclaimer, the term of this patent is extended or adjusted under 35 U.S.C. 154(b) by 177 days.

This patent is subject to a terminal disclaimer.

(21) Appl. No.: 17/174,901

(22) Filed: Feb. 12, 2021

(65) Prior Publication Data

US 2021/0240549 A1    Aug. 5, 2021

Related U.S. Application Data

(63) Continuation of application No. 16/581,701, filed on Sep. 24, 2019, now Pat. No. 10,956,233, which is a
(Continued)

(51) Int. Cl.
*G06F 9/54* (2006.01)
*G06F 16/9035* (2019.01)
(Continued)

(52) U.S. Cl.
CPC .................. *G06F 9/54* (2013.01); *G06F 8/35* (2013.01); *G06F 8/36* (2013.01); *G06F 8/43* (2013.01);
(Continued)

(58) Field of Classification Search
CPC ... G06F 8/35; G06F 16/93; G06F 8/36; G06F 16/9035; G06F 9/54; G06F 8/43; G06F 8/60; G06F 8/73
See application file for complete search history.

(56) References Cited

U.S. PATENT DOCUMENTS

| 8,510,762 | B1 | 8/2013 | Gregorio et al. |
| 10,467,062 | B1 | 11/2019 | Park et al. |

(Continued)

FOREIGN PATENT DOCUMENTS

| CN | 1841377 A | 10/2006 | |
| CN | 102880455 A * | 1/2013 | ............... G06F 8/20 |

(Continued)

OTHER PUBLICATIONS

Taiwanese Intellectual Property Office Action and Search Report issued in counterpart Application No. 109107977 dated Mar. 24, 2021 (15 pages).

(Continued)

*Primary Examiner* — Charles E Anya
(74) *Attorney, Agent, or Firm* — Finnegan, Henderson, Farabow, Garrett & Dunner, LLP

(57) ABSTRACT

Computerized systems and methods for managing API information. An exemplary method includes receiving an input from a user device associated with a first computer system, the input not including identity of a second computer system. The method includes determining a target API based on the input, the target API being the second computer system's API. The method also includes determining whether a user of the user device has access to the target API. The method includes retrieving documentation of the target API from an API database if it is determined that the user has access to the target API. The method includes providing the user device with the retrieved documentation.

20 Claims, 10 Drawing Sheets

Related U.S. Application Data continuation of application No. 16/298,617, filed on Mar. 11, 2019, now Pat. No. 10,467,062.

(51) Int. Cl.
| | |
|---|---|
| *G06F 8/36* | (2018.01) |
| *G06F 8/35* | (2018.01) |
| *G06F 8/41* | (2018.01) |
| *G06F 16/93* | (2019.01) |

(52) U.S. Cl.
CPC .......... *G06F 16/9035* (2019.01); *G06F 16/93* (2019.01)

(56) References Cited

U.S. PATENT DOCUMENTS

| | | | |
|---|---|---|---|
| 2005/0119984 A1* | 6/2005 | Rouvellou | G06F 8/31 706/47 |
| 2006/0143594 A1 | 6/2006 | Grimaldi | |
| 2007/0168957 A1 | 7/2007 | Li et al. | |
| 2013/0132584 A1 | 5/2013 | Palladino et al. | |
| 2014/0317641 A1 | 10/2014 | Trofin et al. | |
| 2015/0095923 A1* | 4/2015 | Sarid | G06F 9/451 719/328 |
| 2015/0169387 A1 | 6/2015 | Trofin et al. | |
| 2015/0254560 A1* | 9/2015 | Laredo | G06F 21/552 706/46 |
| 2016/0092344 A1 | 3/2016 | Bally et al. | |
| 2016/0283289 A1 | 9/2016 | Layzell et al. | |
| 2017/0010902 A1 | 1/2017 | Sarid | |
| 2017/0102925 A1 | 4/2017 | Ali et al. | |
| 2019/0034199 A1* | 1/2019 | Pollock | G06F 8/73 |
| 2019/0095256 A1 | 3/2019 | Trofin et al. | |
| 2019/0339947 A1* | 11/2019 | McCune | G06F 8/34 |
| 2020/0042316 A1 | 2/2020 | Roy et al. | |
| 2020/0133751 A1 | 4/2020 | Bahrami et al. | |

FOREIGN PATENT DOCUMENTS

| | | | | |
|---|---|---|---|---|
| CN | 104156468 A | * | 11/2014 | ............. G06F 21/12 |
| CN | 108959076 A | | 12/2018 | |
| JP | 2001-117948 A | | 4/2001 | |
| TW | 201743217 A | | 12/2017 | |
| WO | WO 2017/214495 A1 | | 12/2017 | |

OTHER PUBLICATIONS

First Examination Report in counterpart Indian Application No. 202047049247 dated Dec. 8, 2021 (5 pages).
Examination Notice in counterpart Hong Kong Application No. 22020004011.5 dated Jan. 26, 2022 (3 pages).
Hong Kong Office Action dated May 28, 2021, Hong Kong Intellectual Property Department, Substantive Examination Notice of Standard Patent (O) counterpart Application No. 22020004011.5, (9 pages).
Japanese Office Action dated Jun. 22, 2021, Notice of Rejection in counterpart Application No. 2020-537740 (7 pages).
Intellectual Property Office of Singapore Written Opinion in counterpart Application No. 11202011424Q dated Sep. 5, 2022 (8 pages).
AU Examination Report in Australian Application No. 2020238942 dated Nov. 19, 2020 (4 pages).
International Search Report issues in related PCT Application No. PCT/IB2020/052070 dated Jun. 29, 2020 (3 pages).
Written Opinion Issued in related PCT Application No. PCT/IB2020/052070 dated Jun. 29, 2020 (7 pages).
Notice of Preliminary Rejection from Korean Intellectual Property Office in corresponding Korean Patent Application 10-2019-0057674, dated Jul. 31, 2020 (3 pages).
Office Action dated Mar. 27, 2023, by the Chinese Patent Office in counterpart Chinese Application No. 2019110618573, 20 pages.

\* cited by examiner

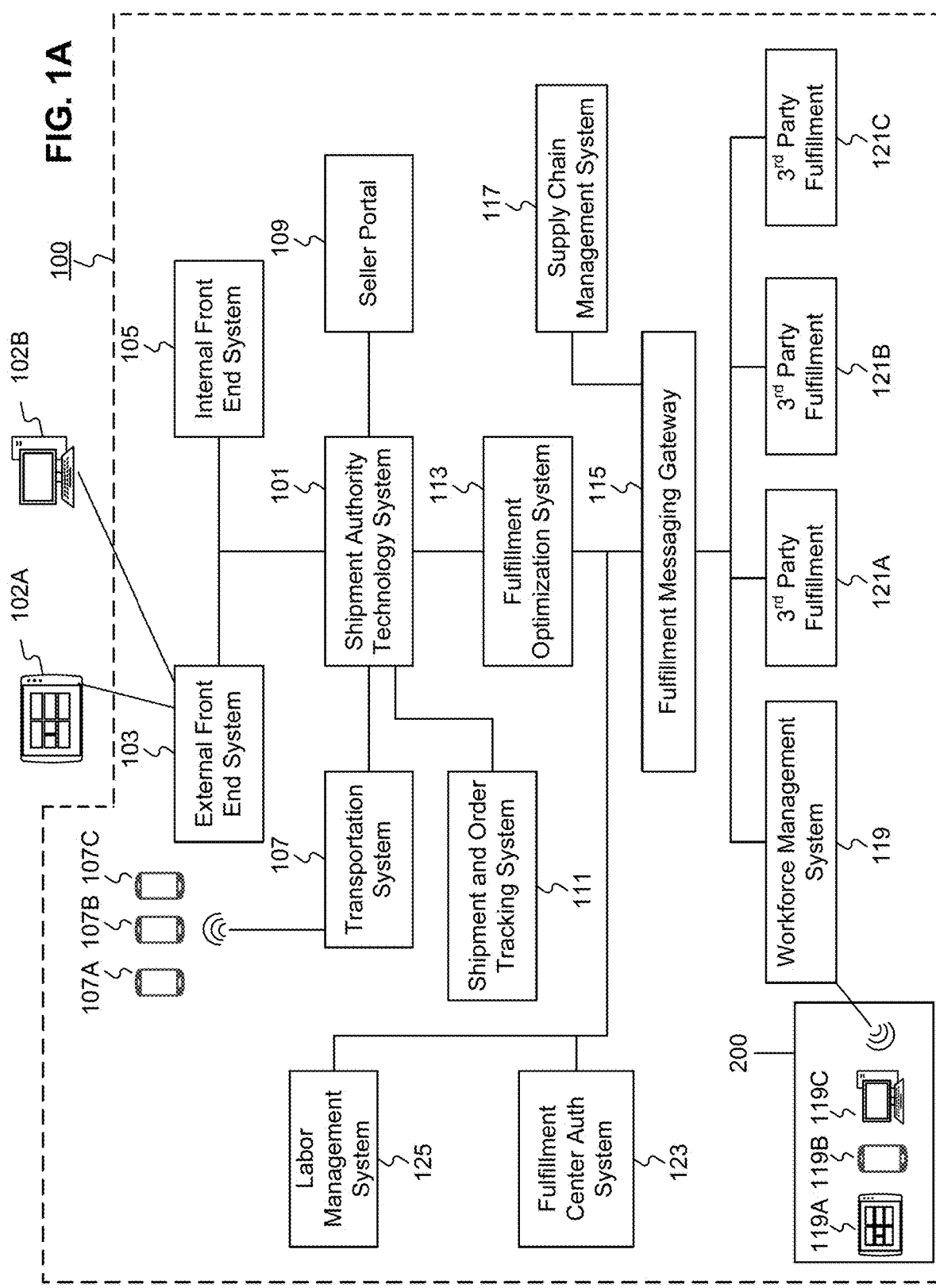

FIG. 1C

SYSTEMS AND METHODS FOR MANAGING APPLICATION PROGRAMMING INTERFACE INFORMATION

CROSS-REFERENCE TO RELATED APPLICATIONS

This application is a continuation of U.S. patent application Ser. No. 16/581,701, filed on Sep. 24, 2019, currently allowed and pending, which is a continuation of U.S. patent application Ser. No. 16/298,617, filed on Mar. 11, 2019, which issued as U.S. Pat. No. 10,467,062 on Nov. 5, 2019. The disclosures of the above-referenced applications are expressly incorporated herein by reference in their entireties.

TECHNICAL FIELD

The present disclosure generally relates to computerized systems and methods for managing application programming interface (API) information. In particular, embodiments of the present disclosure relate to inventive and unconventional systems relate to managing API information of the computer systems stored in a database, and enabling a user of a computer system to get documentation of API of another computer system.

BACKGROUND

An API is a set of routines, protocols, and tools for building software applications. A good API makes it easier to develop a program by providing all the building blocks. A programmer then puts the blocks together. Many operating environments provide APIs so that programmers can write applications consistent with the operating environment. The APIs typically have associated documentation that provides instructions for using the API.

The documentation can exist in a variety of forms. In the past, the most common form for the documentation was bounded, hard-copy manuals. These manuals were typically large and bulky manuals that contained hundreds of pages of detailed information. To locate and retrieve information from these manuals, programmers were typically forced to search through massive amounts of irrelevant information. In a large organization that has many different business units, operating environments, computer systems and APIs, these manuals would cost programmers a lot of time and effort in searching and determining the correct API and its associated documentation they are looking for.

In this age of information technology, an abundance of these hard-copy manuals have been converted to electronic versions and placed in databases. Further, some newer documentation is specially designed for the Internet and computer systems. This includes documentation tools and interfaces that can generate or assist to generate electronic versions of documentations that are user-friendly and can be easily converted to programming codes applicable to APIs.

However, electronic versions of documentations of APIs may not be sufficient to overcome certain technical problems. In a large organization that has many different business units, operating environments, computer systems and APIs, the amount and complexity of APIs and their documentations have made it difficult for the organization's database to manage. Users in different business units and operating environments may attempt interactions with APIs of other business units and operating environments. It is inefficient to require a developer to know the identity of every business unit, operating environment, computer system, and API that they might interact with. Developers working on APIs associated with different computer systems or even subsystems of one computer system may need to use different coding languages as optimized choices for each different functionality. The large organization may have its computer systems and APIs updating very quickly, which makes it more difficult and cumbersome for developers of all APIs to keep up with the change and resolve conflicts timely. A simple electronic version of documentation or a system simply storing documentations do not relive the users much burden or provide timely coordination.

Therefore, there is a need for improved methods and systems for electronic API management.

SUMMARY

One aspect of the present disclosure is directed to a system for managing API information. The system may comprise at least one processor, a database storing data and documentations associated with APIs of computer systems, and at least one memory containing instructions that, when executed by the at least one processor, cause the processor to perform operations. The operations may comprise receiving input from a user device associated with a first computer system, the input not including identity of a second computer system. The operations may also comprise excluding APIs associated with computer systems that are inaccessible to a user of the user device based on the user's permission level, and determining a target API based on the input and determining whether a user of the user device has access to the target API, the target API being the second computer system's API. If it is determined that the user has access to the target API, the system may retrieve documentation of the target API from the API database and provide the user device with the retrieved documentation of the target API.

Another aspect of the present disclosure is directed to a method for managing API data and documentations. The method may comprise receiving an input from a user device associated with a first computer system, the input not including identity of a second computer system. The method also may comprise excluding APIs associated with computer systems that are inaccessible to a user of the user device based on the user's permission level, determining a target API based on the input, the target API being the second computer system's API, and determining that a user of the user device has access to the target API. The method further comprises, if it is determined that the user has access to the target API, retrieving documentation of the target API from the API database, and providing the user device with the retrieved documentation of the target API.

Yet another aspect of the present disclosure is directed to a system for managing API information. The system may comprise at least one processor, a database storing data associated with APIs, each API being associated with at least one computer system, each of the computer systems being connectable with other ones of the computing systems through the respective APIs, and at least one memory containing instructions that, when executed by the at least one processor, cause the processor to perform operations. The operations may comprise receiving an input from a user device associated with a first computer system, the input not including identity of a second computer system, excluding APIs associated with computer systems that are inaccessible to a user of the user device based on the user's permission level, and determining a target API based on the input, the target API being the second computer system's API. The operations comprise determining whether a user of the user device has access to the target API, and if it is determined that the user has access to the target API, retrieving documentation of the target API from the API database and providing the user device with the retrieved documentation of the target API. The operations further comprise receiving a request to register an API of one of the computer systems in the API database, storing data associated with the API in the API database, generating documentation associated with the API based on the request and storing the documentation in the database, and receiving a request to update data or documentation of one of the APIs stored in the API database. The operations further comprise updating the data or documentation of the API based on the request, and in response to the request, sending a notification to user devices associated with the computer systems.

Other systems, methods, and computer-readable media are also discussed herein.

BRIEF DESCRIPTION OF THE DRAWINGS

Figure 1C:
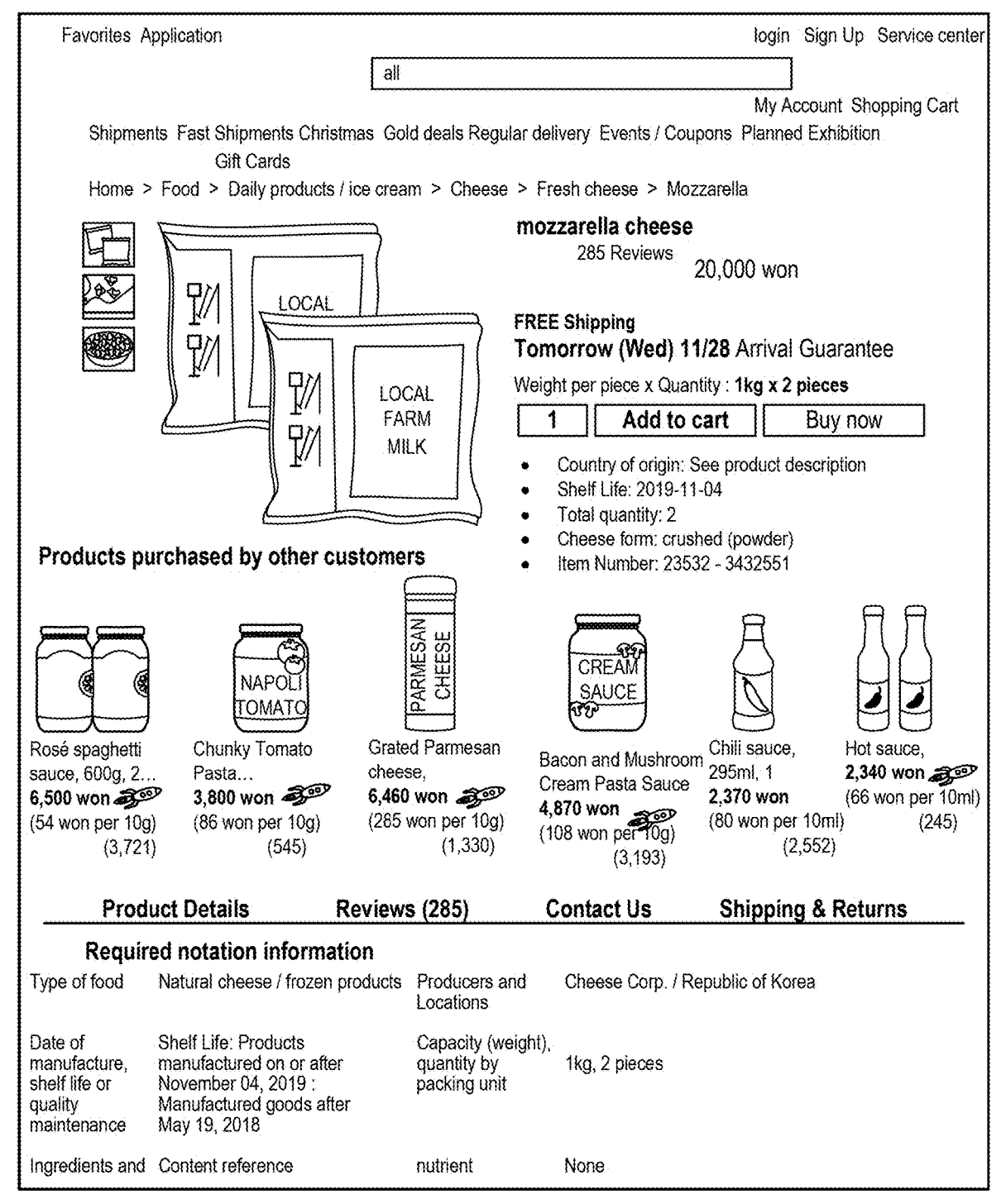

FIG. 1A is a schematic block diagram illustrating an exemplary embodiment of a system comprising computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for managing API information.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
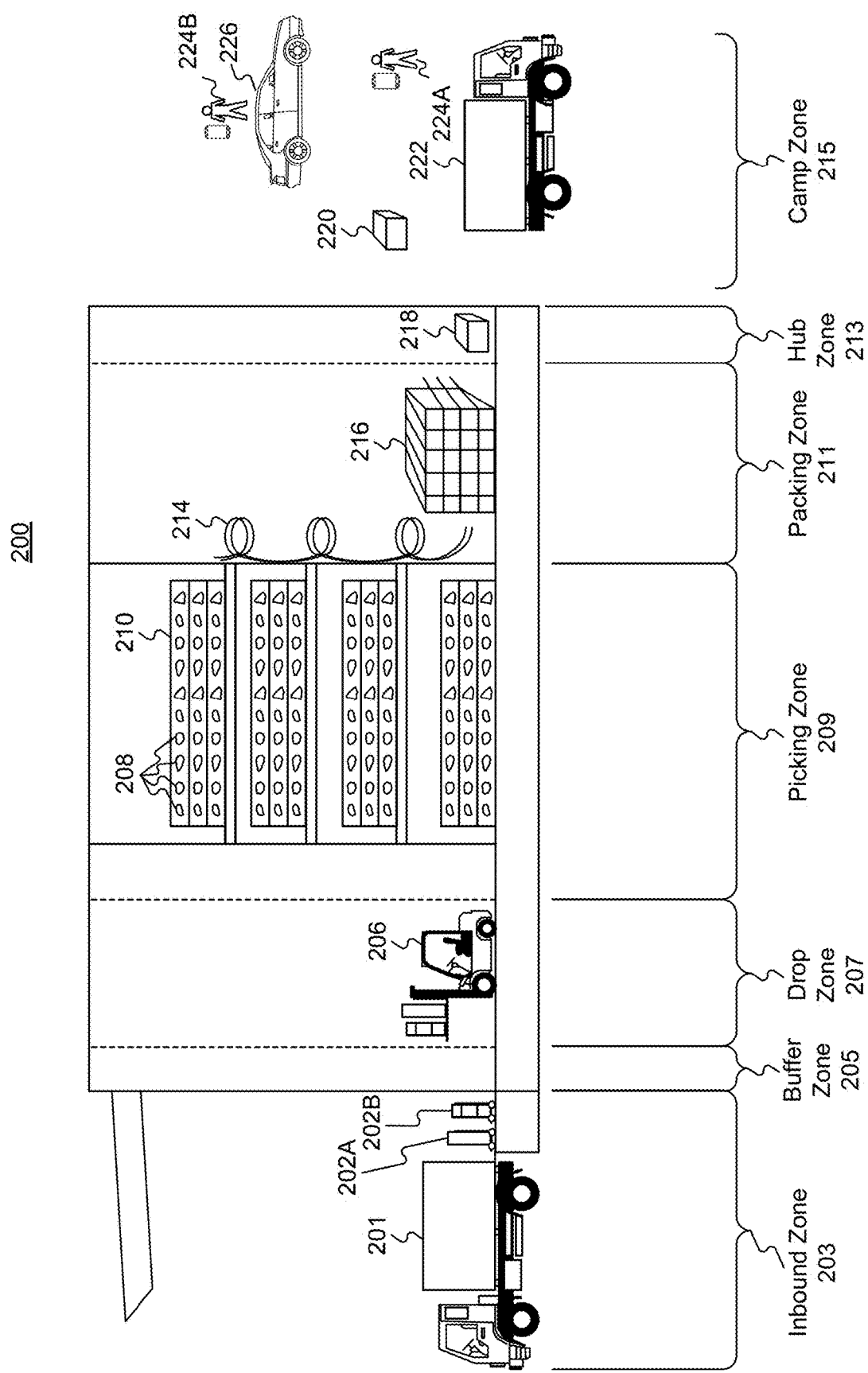
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
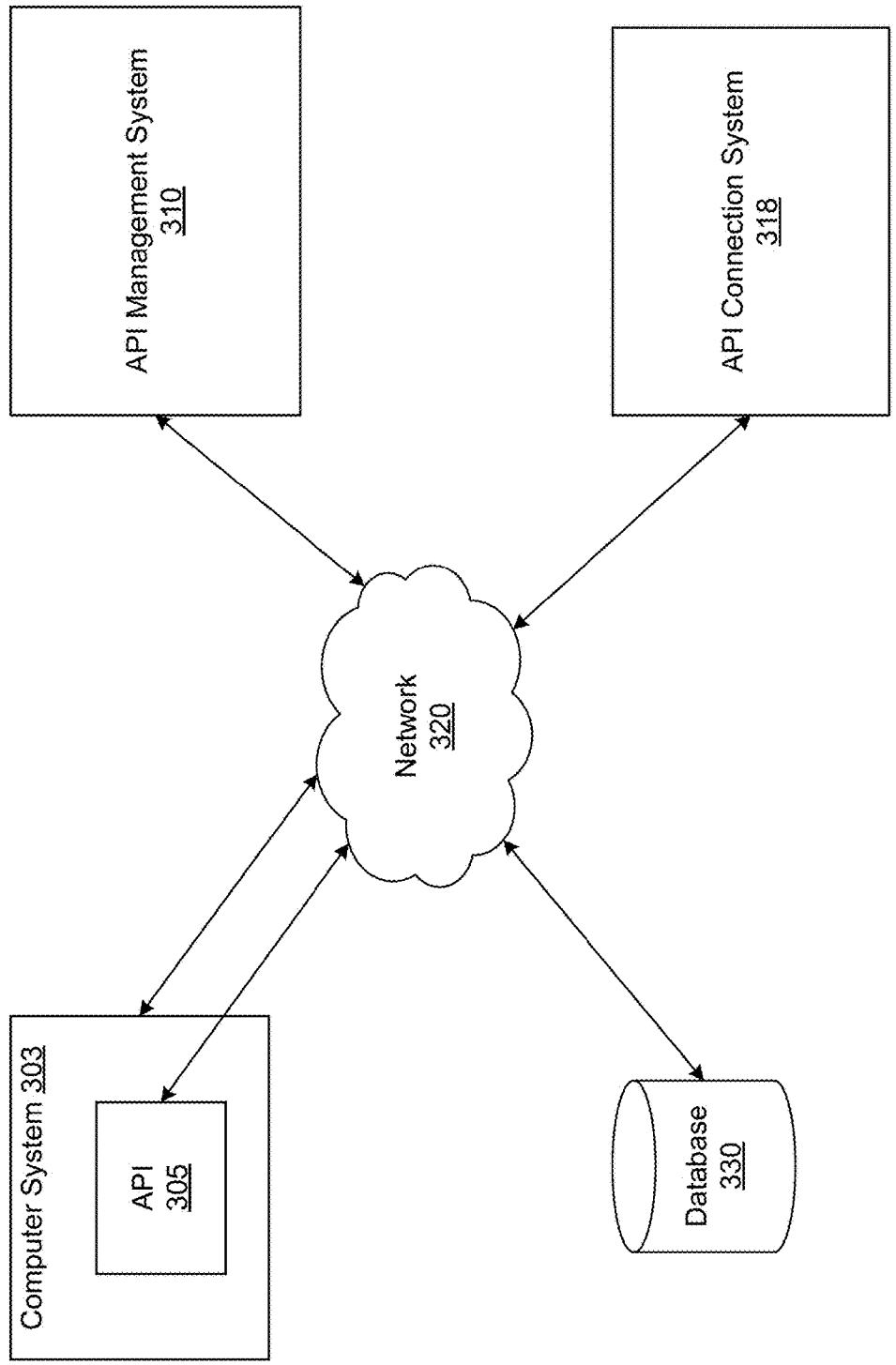
FIG. 3 depicts a schematic of an exemplary system for managing API information, consistent with the disclosed embodiments.

FIG. 3 depicts a schematic of an exemplary system for managing API information (exemplary system 300), consistent with disclosed embodiments. System 300 may comprise an API management system 310, API connection system 318, computer system 303, APIs 105, database 330 and network 320. The APIs of the computer systems may be connected to each other through network 320. Computer system 303 may comprise one or more APIs. APIs of the same computer system may also be connected to each other through network 320. A user device associated with one computer system or a user of the user device may also be connected to APIs of other computer systems through network 320.

Computer system 303 may be a computer system, including one or more of the systems in system 100. There may be multiple computer systems 303, each of which may be connected to one another (e.g., directly or through network 320). Computer system 303 may include one or more computing devices, such as servers, workstations, desktop computers, mobile devices, or special-purpose computing devices. Computer system 303 may also be part of a subsystem of the variety of systems in system 100. For example, computer system 303 may be a subsystem of FO system 113 that calculates a corresponding PDD (promised delivery date) for each product.

API 305 may comprise one or more APIs, as computer system 303 may have one or more APIs or may have subsystems that each has its own APIs. API 305 may also be associated with one or more computer systems. The API may comprise a plurality of functions and layers that are collectively referred to herein as the API. In some embodiments, the API may comprise a plurality of layers, such as a user interface layer, an API functions layer, a computer system layer, a common language layer, or a database later. The layers may comprise a plurality of functions. For example, the API functions layer may comprise groups of functions providing different resource or service to the users of the API, such as application programmers, customers, supervisors or the like. Users may work on functions that are related to and connected to a network platform, the network being a private network within the computer system, operating environment, or the whole organization, or being a public network related to outside users. The programmer users can create web applications for computing systems that make full use of the network resources and other web services, without needing to understand the complex technical details of how those network resources actually operate or are made available.

The applications using API 305 may be written in a plurality of programming languages. For example, the applications may be written in .Net Framework, .Net Compact Framework (and related languages, such as Visual Basic, C, etc.), Java, C++, Objective-C, HTML, HTML/AJAX combinations, XML, or HTML with included Java applets. In some embodiments, API 305 may support a limited number of preferred languages of choice optimized for the functionality of the computer system or subsystem. In other embodiments, API 305 may comprise a common language layer that translates the programming languages into an intermediate language supported by the common language layer and included as part of a common language output of the API that connects to computer system 303 or externally through network 320. In this way, API 305 can effectively provide a wide and diverse variety of applications to accommodate different kinds of computer systems, subsystems, and practical needs, as well as to enable other components of the exemplary system 300 through network 320, such as API management system 310, to achieve their functionalities.

API management system 310 may include or may access one or more storage devices configured to store data and/or software instructions used by one or more processors of API management system 310 to perform operations consistent with the disclosed embodiments. For example, API management system 310 may include memory configured to store one or more software programs that perform several operations when executed by a processor, including operations specific to the disclosed methods. The disclosed embodiments are not limited to separate programs or computers configured to perform dedicated tasks. For example, API management system 310 may include memory that stores a single program or multiple programs. Additionally, API management system 310 may execute one or more programs located remotely from API management system 310. For example, API management system 310 may access one or more remote programs stored in memory included with a remote component (such as database 330) that, when executed, perform operations consistent with the disclosed embodiments.

Database 330 may be one or more computer systems or implemented computer systems. Database 330 may include server software that generates, manages, and provides operations associated with information of APIs. In some embodiments, API management system 310 may connect with separate server(s) or other computing devices associated with database 330 that generates, manages, and provides services associated with information of APIs for operations performed by API management system 310.

Database 330 may be configured to store information of API 305, consistent with disclosed embodiments. Database 330 may be configured to store information of APIs provided when APIs are registered and updated, the information comprising index information, identification information, access information, introduction and rules, development and debugging notes, and information change for each update. Database 330 may create entries for all APIs registered in database 330 respectively to have records of selecting or using the APIs. The records of selecting the APIs may be with respect to the selection of each API of each part of an API. The records of using the APIs may be with respect to the using of each API of each part of an API. Database 330 may also create entries for all users that have searched for, selected, connected with APIs through the network 320. Database 330 may keep records of each user's activities through the network 320 or associated with API management system 310. The user's activities may include searching, selecting and connecting with APIs and may be recorded with respect to their activities with each API.

Database 330 may be associated with API management system 310 and made accessible to network 320. In some embodiments, database 330 may be provided as part of API management system 310. API management system 310 may have one or more storage memories, which have stored one or more programs that, when executed, perform operations consistent with the disclosed embodiments. API management system 310 may have a database that include server software that generates, manages, and provides operations associated with information of APIs. API management system 310 may also create entries in its database part or one or more storage memories to have records of using the APIs and records for all users, consistent with the disclosed embodiments of database 330. For example, when API management system 310 receives an input from a user to search for APIs, API management system 310 and/or database 330 may record the search in a record of the user searching APIs. When the user selects a part of an API that the user intends to use, API management system 310 and/or database 330 may record the selection in a record of the user selecting APIs, a record of selecting the API, and a record of selecting the part of the API. When the user then connects with the part of the API, API management system 310 and/or database 330 may record the activity in a record of the user using APIs, a record of using the API, and a record of using the part of the API.

Network 320 may be configured to provide communications between components of FIG. 3. For example, network 320 may be any type of network (including infrastructure) that provides communications, exchanges information, and/or facilitates the exchange of information, such as the Internet, a Local Area Network, or other suitable connection(s) that enables API management system 310 to send and receive information between the components of API management system 310. In some embodiments, network 320 may be a separate network from the one or more networks in FIG. 1A. In other embodiments, network 320 may be integrated with or connected to the one or more networks in FIG. 1A.

API connection system 318 may be configured to connect the user to the target API. In some embodiments, API connection system 318 connects the user to the target API following step 640 in FIG. 6 (described below), or may start after receiving a request from API management system 310. API connection system 318 may have a memory storing all the APIs registered in API management system 310 so the user can work on servers of API connection system 318 without communicating with or being connected to other devices or systems, such as the computer system of the target API, when working on the target API. API connection system 318 may have a memory to store the APIs or may store remotely in database 330. In some embodiments, API connection system 318 may be part of API management system 310.

Computer system 303 may have one or more APIs 305. Computer system 303 having an API means, in some embodiments, that it stores functionality and code enabling user devices associated with computer system 303 to operate applications that request data from, process data of, or send data to computer system 303. Computer system 303 may include a memory storing source code of API 305. Source code of API 305 may also be stored remotely from computer system 303. API management system 310 may be configured to register APIs of computer system 303 in API management system 310, as discussed below with respect to in FIG. 4.

Any of the devices and systems depicted in FIG. 3 may include one or more processors, one or more memories, and one or more input/output (I/O) devices. These components may communicate with each other via buses or wirelessly. The components may reside in a single device or multiple devices. In some embodiments, the devices and systems may take the form of a server, specially-programmed computer, a mainframe computer, laptop, smartphone, mobile device, or any combination of these components. In certain embodiments, the devices and systems may be configured as a particular apparatus, system, and the like based on the storage, execution, and/or implementation of the software instructions that perform one or more operations consistent with the disclosed embodiments. The devices and systems may be standalone, or it may be part of a subsystem, which may be part of a larger system.

The processor may comprise a central processing unit (CPU), graphical processing unit (GPU), or similar microprocessor, including one or more known processing devices, such as a microprocessor from the Pentium™ or Xeon™ family manufactured by Intel™ the Turion™ family manufactured by AMD™ or any of various processors manufactured by Sun Microsystems or Apple, Inc., for example. The processor may constitute a single core or multiple core processor that executes parallel processes simultaneously. For example, the processor may be a single core processor configured with virtual processing technologies. In certain embodiments, the processor may use logical processors to simultaneously execute and control multiple processes. The processor may implement virtual machine technologies, or other known technologies to provide the ability to execute, control, run, manipulate, store, etc. multiple software processes, applications, programs, etc. In another embodiment, the processor may include a multiple-core processor arrangement (e.g., dual, quad core, etc.) configured to provide parallel processing functionalities to allow the devices and systems to execute multiple processes simultaneously. The devices and systems may include one or more of the processors and may further operate with one or more other processors that are remote with respect to the processors. One of ordinary skill in the art would understand that other types of processor arrangements could be implemented that provide for the capabilities disclosed herein. The disclosed embodiments are not limited to any type of processor(s) configured in the devices and systems.

The memory may include one or more storage devices configured to store instructions executable by the processor to perform functions associated with the disclosed embodiments. For example, the memory may include a computer hard disk, random access memory (RAM), removable storage, or remote computer storage. For example, the memory may be configured with one or more software instructions that perform particular functions when executed by the processor. The disclosed embodiments are not limited to separate programs or computers configured to perform dedicated tasks. Additionally, the processor may execute one or more programs located remotely from the devices and systems. For example, computer system 303, API 305, or database 330 may, via API management system 310 (or variants thereof), access one or more remote programs that, when executed, perform functions related to certain disclosed embodiments. The processor may further execute one or more programs located in database 330. In some embodiments, instructions may be stored in an external storage device, such as a cloud server located outside of API management system 310, and the processor may execute instructions remotely.

The memory may also store data that reflects any type of information in any format that exemplary system 300 may use to perform operations consistent with the disclosed embodiments. The memory may store instructions to enable the processor to execute one or more applications, such as server applications, network communication processes, and any other type of application or software, such as interactive user interface of front end system 103. Alternatively, the instructions, application programs, etc., may be stored in an external storage. For example, the instructions of API management system 310 may be stored in database 330 and are in communication with API management system 310 via network 320 or any other suitable network. The memory may be a volatile or non-volatile, magnetic, semiconductor (e.g., EEPROM, flash memory, etc.), tape, optical, removable, non-removable, or other type of storage device or tangible (i.e., non-transitory) computer readable medium.

The I/O device may include hardware and/or a combination of hardware and software for communicating information to the devices and systems from a user of the devices or devices of the systems. In some embodiments, the user may be a direct user of the devices or devices of the systems. In some other embodiments, the user may be another user device or systems connected to the devices and systems. The hardware and software may be, for example, a keyboard, mouse, trackball, audio input device, touch screen, infrared input interface, or similar device.

Figure 4:
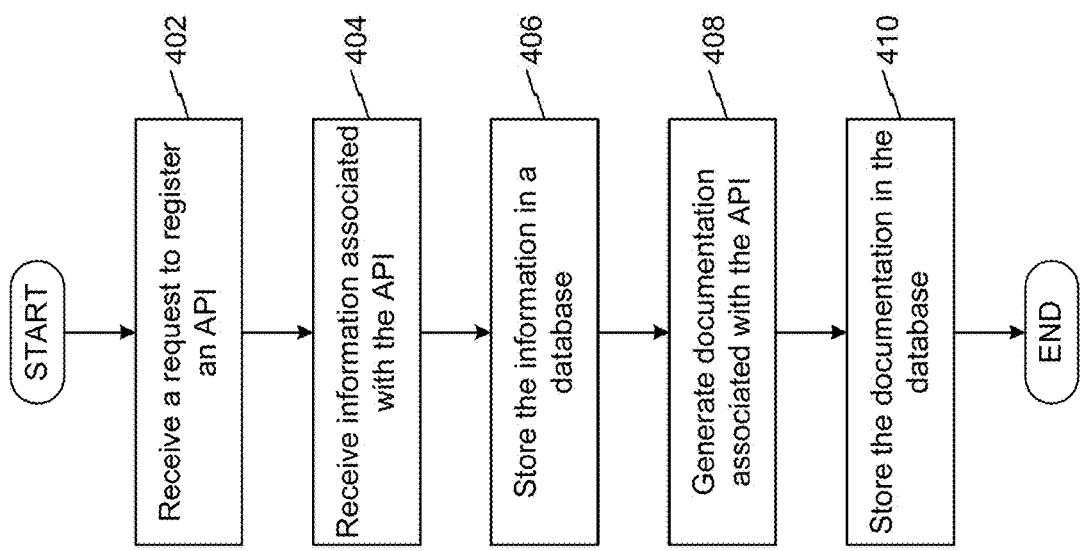
FIG. 4 depicts a process for registering an API in a database, consistent with the disclosed embodiments.

FIG. 4 depicts a process 400 for registering an API in a database, consistent with the disclosed embodiments.

In step 402, API management system 310 receives a request to register an API in the system. In some embodiments, the request may be from computer system 303 or a user device associated with computer system 303. In some embodiments, the request may be from API 305 or a user of API 305. In some other embodiments, the request may be from a user of a user device that directly send the request through an interface of the API management system 310. The request may contain information of the API given by the user through an interface when sending the request.

In step 404, API management system 310 receives information of the API to be registered. The information may comprise index information, identification information, access information, authorization with respect to permission level, introduction and rules, development and debugging notes, and a record of previous use of the API, all of which may be collectively referred to as data of the API. The access information may indicate that the API is open for all users, APIs, and computer systems. The access information may also indicate that the API always require a request from the user, API or computer system that intends to use or connect with it. The access information may also indicate that the API may be at least one of: (1) open for some users, APIs, or computer systems; (2) inaccessible for some other users, APIs, or computer systems; or (3) requires a request from some other users, APIs, or computer systems when they intend to use or connect with the API. The information may also comprise documentations of the API. In some embodiments, the information may be included in the request to register the API. In some other embodiments, the information is received through interactive process between the interface of API management system 310 and the user, API or computer system.

In step 406, API management system 310 may store the information of the API in an API database of exemplary system 300. In some embodiments, API management system 310 may have its own API database and may store the information in its own API database.

In step 408, API management system 310 may generate documentation associated with the API based on the information received. API management system 310 may also incorporate documentation received with the documentation generated. In some embodiments, as a part of generating the documentation, API management system 310 may prepare a set of rules of generating codes for using the API. The set of rules may enable the API management system 310 to quickly and automatically generate codes for users connected to the API so that the users may skip learning every part of the API and do not need to develop a program from scratch, and may adapt received source code for their desired purposes.

In step 410, API management system 310 may store the documentations of the API in the API database of exemplary system 300. In some embodiments, API management system 310 may have its own API database and may store the documentations in its own API database.

API management system 310 may be configured to update information of an API, as discussed below with respect to FIG. 5.

Figure 5:
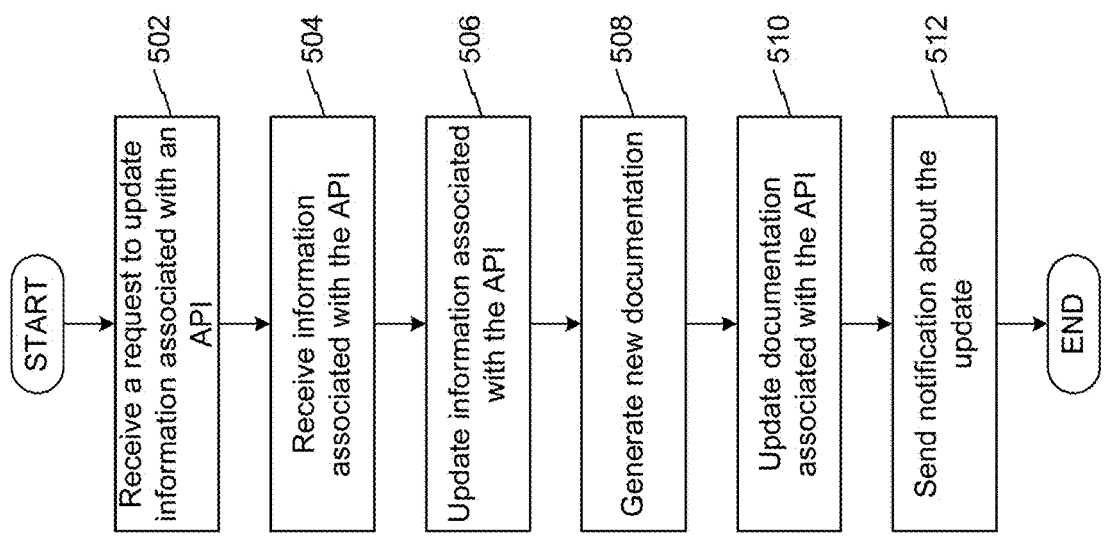
FIG. 5 depicts a process for updating API information in a database, consistent with the disclosed embodiments.

FIG. 5 depicts a process 500 for updating API information in a database, consistent with the disclosed embodiments.

In step 502, API management system 310 receives a request to update information of an API in the system. In some embodiments, the request may be from computer system 303 or a user device associated with computer system 303. In some embodiments, the request may be from API 305 or a user of API 305. In some other embodiments, the request may be from a user of a user device that directly sent the request through an interface of the API management system 310. The request may contain information of the API given by the user through an interface when sending the request.

In step 504, API management system 310 receives information of the API to update with. The information may comprise index information, identification information, access information, authorization with respect to permission level, introduction and rules, development and debugging notes, and a record of previous use of the API, all of which may be collectively referred to as data of the API. API management system 310 may compare the new information with the previous information, detect and record the information change as an entry stored as part of the information of the API. If the request is not from the computer system that registered the API, API management system 310 may notify the computer system about the request to update and require a confirmation before proceeding to next step. The information may also comprise documentations of the API. In some embodiments, the information may be included in the request to update the information of the API in step 502. In some other embodiments, the information is received through interactive process between the interface of API management system 310 and the user, API or computer system.

In step 506, API management system 310 may update the information of the API in an API database of exemplary system 300. In some embodiments, API management system 310 may have its own API database and may update the information in its own API database.

In step 508, API management system 310 may generate new documentation associated with the API based on the information received. API management system 310 may also incorporate documentation received with the documentation generated. In some embodiments, as a part of generating the documentation, API management system 310 may prepare a set of rules of generating codes for using the API. The set of rules may enable the API management system 310 to quickly and automatically generate source codes for user devices connected to the API so that the users of the user devices may skip learning every part of the API and do not need to develop a program from scratch, and may directly add their own source codes or functionalities onto the generated source code.

In step 510, API management system 310 may update documentations of the API in the API database of exemplary system 300. In some embodiments, API management system 310 may have its own API database and may update the documentations in its own API database.

In step 512, API management system 310 may send a notification to computer system 303 about the update. In some embodiments, API management system 310 may send a notification only to the computer systems that had access to the API. In some embodiments, API management system 310 may send notification only to the computer systems that had used the API. API management system 310 may send notification through email, message, or other specific communication tools.

Figure 6:
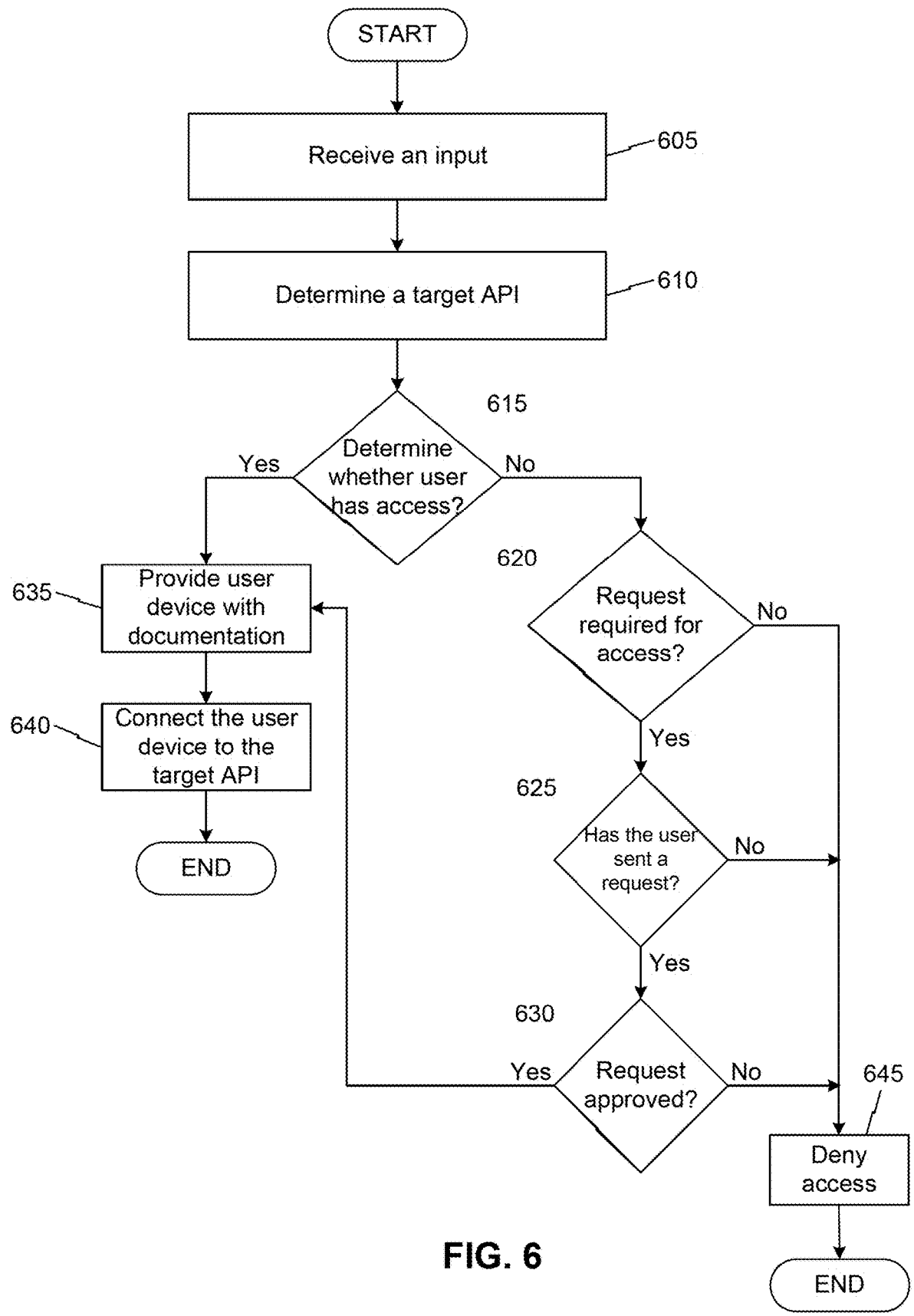
FIG. 6 depicts an exemplary process of providing documentation to a user device, consistent with the disclosed embodiments.

FIG. 6 depicts an exemplary process of providing documentation to a user device, consistent with the disclosed embodiments. In step 605, API management system 310 may receive an input from a user device. In some embodiments, the user device may be associated with computer system 303. In some embodiments, the request may be from API 305 or a user of API 305. In some other embodiments, the input may be from a user that directly sent the request through an interface of the API management system 310. In some embodiments, the input may omit an identity of a computer system associated with a desired API. This provides efficiency in that users (e.g., developers) do not need to know in advance which computer systems or APIs to use.

In some embodiments, the input may omit the identity of a specific functionality. For example, API management system 310 may receive an input (e.g., from a user device associated with FO system 113) including a request for "Promised Delivery Date (PDD) data" and "shipment data." (For example, a developer may be developing an application for FO system 113 that uses PDD data.) The user need not select a computer system or an API in advance of searching, which provides advantages over prior art systems for API documentation review and searching.

In some embodiments, the input in step 605 may comprise one or more conditions. The condition may be a condition that database 330 uses to sort APIs. For example, the condition may be (1) keywords describing functionalities of the systems that the APIs are associated with, such as transportation, delivery, or front end; (2) keywords or categorical terms describing the hierarchy of APIs, such as whether the API is related to a system or a subsystem, whether the API is the only API of a computer system; (3) a number, a date or a date range referring to versions; or (4) the purpose of the search, such as what kind of functionality or data the user is looking for from another API. The condition may be categorical terms provided by an interface of API management system 310 that corresponds to information of APIs, enabling a user to select information rather than spending time to refine keywords. In some embodiments, the input may be a request to retrieve a list of APIs stored in database 330 that satisfies certain conditions. Upon receiving such request, API management system 310 may not proceed to step 610 or any later steps but just generate a list of APIs and provide it to the user. In some other embodiments, the input may be any request that can be fulfilled by executing instructions stored in API management system 310, or remotely stored in database 330.

In step 610, API management system 310 may determine a target API. A target API is an API that satisfy the input and may be determined based on one or more additional steps. In receiving an input with one or more conditions in step 605, API management system 310 may determine one or more APIs satisfying the conditions. In some embodiments, API management system 310 may start determining a target API by first excluding APIs associated with computer systems that are inaccessible to the user of the user device based on the user's permission level and/or APIs' authorization with respect to permission levels. For example, a senior developer may have a higher permission level than a junior or contract developer, so with the same input the API management system 310 may determine a target API from a larger API pools for a senior developer than a junior or contract developer. This process can enhance the efficiency and accuracy of API management system 310 in determining the target API, as well as minimize unnecessary exposure of API information (thus enhancing data security).

In some embodiments, API management system 310 may determine the target API from the one or more APIs satisfying the conditions based on records of using the APIs. For example, when a user of a user device associated with FO system 113 is developing an application that uses Promised Delivery Date (PDD) data, the user could search for searches "shipment" and "data" in API management system 310, and shipment and order tracking system 111 and SAT system 101 may both satisfy the conditions. However, there may be more records of using the APIs of SAT system 101 by FO system 113 than records of using the APIs of shipment and order tracking system 111 by FO system 113, so API management system 310 may determine that the API in SAT system 111 (having the most associated records related with FO system 113) should be the target API. The data in SAT system 101 associated with the target API is very likely more suitable and well-organized for the user in FO system 113 than data associated with other APIs or systems. If in a rare case the user wants to connect to an API in another system, the user can still select the API among the list, consistent with some other embodiments.

In some embodiments, API management system 310 may determine the target API from the one or more APIs satisfying the conditions based on the search history, selection history or using history of the user. In some other embodiments, API management system 310 may provide the APIs satisfying the conditions to the user and the user may select the target API. In some embodiments, the input does not comprise one or more conditions but is a request that aims at a selection of APIs and can be fulfilled by executing instructions stored in API management system 310, or remotely stored in database 330, API management system 310 may provide further instruction to the user through an interface to specify the selection of APIs based on the instructions stored. For example, a user associated with FO system 113 may want to obtain data related to PDD but does not know much about other systems. The API management system may contain instructions to automatically search among data of the APIs stored in database 330 and obtain a list of APIs that has data related to PDD. The API management system may further contain instructions to provide the user with the list of the APIs with an excerpt of the data or description of the data related to PDD that enable the user to accurately and efficiently select the target API without requiring knowledge of available APIs before searching.

In step 615, API management system 310 may determine whether the user has access to the target API. In determining whether a user has access to an API, API management system 310 may retrieve the data stored in the API database associated with the API. More specifically, API management system 310 may consider the access information associated with the API, which may be a part of the data. The access information may indicate that the API (A) is open for all users, APIs, and computer systems; (B) always requires a request from the user, the API or the computer system that intends to use or connect with the API; or (C) is open for some users, APIs, and computer systems and requires a request from some other users, APIs, and computer systems when they intend to use or connect with the API. The access information may also indicate that the API is not accessible to one or more users. In some other embodiments, determining whether the user has access to the target API may comprise communicating with the target API, or the computer system of the target API to determine associated user permissions. The user permission may comprise information of whether the user is allowed to access the target API. Communicating to determine user permissions may also comprise requesting a list of users that are assigned access to the target API and determining whether the user has access by checking if the user is on the list.

In some embodiments, if in step 615 the access information indicates that the API is open for all users, APIs, and computer systems, API management system 310 may proceed to step 635 and provide the user device with documentation of the target API. In some embodiments, if in step 615 the access information indicates that the API always require a request from the user device, the API or the computer system that intends to use or connect with the API, API management system 310 may proceed to step 620 and require the user of the user device to send request to the target API. If in step 615 the access information indicates that the API is open for some users, APIs, and computer systems and require a request from some other users, APIs, and computer systems when they intend to use or connect with the API, API management system 310 may respond accordingly, consistent with the embodiments disclosed herein. For example, if the user is from a user device associated with FO system 113 and intends to connect with an API of SAT system 101, and the access information associated with the API indicates that the API is open to FO system 113 and any user that is a manager, API management system 310 may connect the user to the API. But if the user is not a manager and is using a user device of labor management system 125, the API management system 310 may notify the user device to send a request to the SAT system 101. In some other embodiments, if the access information may indicate that the API is not accessible to one or more users, API management system 310 may proceed to step 645 and deny the user's access accordingly. In some other embodiments, API management system 310 may interact with the user through an interface to send request to the API. If the input relates to instructions executed without a need to check access information, such as simply providing a list of APIs satisfying one or more conditions rather than retrieving the document associate with the APIs, API management system 310 may proceed to fulfill the request of the input without checking access information.

In step 620, API management system 310 may communicate to the user through an interface or email, message, or other specific communication tools that the API requires the user sending a request to the API before retrieving the documentation.

In step 625, if the user sends request to the target API, API management system 310 may receive a notification, through network 320, by the target API or the computer system that the target API is associated with. API management system 310 may proceed to step 630. If API management system 310 determine, after certain period, that the user has not send the request to the target API, API management system 310 may proceed to step 645 and deny access. In some embodiments, API management system 310 may look at a set of rules stored in database 330 associated with the target API to determine the length of the period. In some other embodiments, API management system 310 may have instructions stored in a memory or remotely in database 330 specifying the length of the period.

In step 630, API management system 310 may receive an approval from the target API or the computer system that the target API is associated with that the target API or the computer system has approved the access to the user. Upon receiving of the approval, API management system 310 may proceed to step 635. If API management system 310 has not received an approval after certain period or received a denial, API management system 310 may proceed to deny access in step 645.

In step 635, API management system 310 may provide the user device with documentation of the target API. The documentation may be of a huge volume that requires a lot of time and effort of the user to locate which part may be useful. API management system 310 may enhance the efficiency of this process by automatically executing instructions to provide the user device with documentation associated with just part of the target API, which can save the user a lot of time and effort in locating which part of the target API or documentation is needed. Therefore, in some embodiments, API management system 310 may provide the user device with documentation of part of the target API. In some embodiments, API management system 310 may provide the user device with one or more parts of the target API for the user to select. API management system 310 may store in a memory or remotely in database 330 information associated with the parts of the API to assist user in selecting which parts are needed.

In some embodiments, to further enhance the degree of automation in the process of deciding the part of the target API, API management system 310 may automatically narrow down the selection of the parts of the target API. API management system 310 may look at records of using the target API and may include them into consideration together with the input to determine the parts of the target API. API management system 310 may also look at records of using the target API and may include them into consideration together with the input to determine the parts of the target API. API management system 310 may also look at information associated with the API to assist the determination. In some other embodiments, API management system 310 may use a combination of the embodiments disclosed herein and may assign a weight coefficient on different embodiments in determining the parts of the target API. API management system 310 may narrow down the selection of parts of the target API using the records of using the target API, the records of using the target API, or the input, and provide the selection of parts after the narrow-down to the user device for selection. For example, API management system 310 may receive an input from a user device in step 605 to search for an API that performs certain function, determine a target API for the user of the user device and that the user has access to the target API. But the target API has 20 parts and each has a lot of documentation, only one or few of the 20 parts are related to the function. Instead of having the user manually search for the part of API that performs the function, API management system 310 may narrow the selection first. In step 635, API management system 310 may look at records of using the target API, and assign a higher weight coefficient to the record of using to get an evaluation of the popularity of all the parts of the target API. API management system 310 then exclude the parts that neither satisfy the conditions of the input nor have a high popularity. API management system 310 provide the left parts as a narrow-down list of parts to the user device for selection. API management system 310 also retrieves information associated with the narrow-down parts of the target API such as description, set of rules and excerpt of JSON codes to assist the user in selecting.

In step 635, after the part of the target API has been decided, API management system 310 may provide user device with documentation associated with that part of the target API. If it has been determined that documentation of the whole target API is needed, API management system 310 may provide the whole documentation.

In some embodiments of step 635, API management system 310 may provide user device with source code associated with the target API or the part of the target API for the user. The source code may be in a language generally used in APIs, such as .Net Framework, .Net Compact Framework (and related languages, such as Visual Basic, C, etc.), Java, C++, Objective-C, HTML, HTML/AJAX combinations, XML, or HTML with included Java applets. The source code may also be in a programming language, such as JSON or YAML, that is more specific to API documentation and documentation interfaces. The source code may be directly applicable to the target API. For example, if the user is using an API that uses C++ language, and the target API is using JAVA, API management system 310 may automatically generate and provide user with source code in JAVA that can be directly applicable for the user to connect with the target API and work with the function or the part that the user intends to. This automation may significantly enhance the efficiency of users programming and using applications cross different APIs and computer systems. Furthermore, when a user work on a target API, the user sometimes needs to access other APIs as well. For example, when a user of an API of internal front end system 105 is working on an application that connects to transportation system 107, the user may also need to access APIs of mobile devices 107A-107C separately to generate separate application functions optimized for each type of devices. In order to enable the user to efficiently work in such situation, in step 635 in addition to generating documentation and source code associated with a part of a transportation system 107 API that is the target API, API management system 310 may also generate documentation and supplemental source code of corresponding APIs of mobile devices 107A-107C.

API management system 310 may generate supplemental source code by determining the parts of APIs that are associated with the parts of the target APIs that are selected. The determination may comprises one or more of: (A) determining by the user selecting the parts of APIs in a list provided by API management system 310; (B) API management system 310 looking at records of using the parts of the target APIs and looking for which APIs and which parts are associated with the selected parts of the target APIs when using; (C) API management system 310 looking at information of the parts of the target API for instructions on generating source codes applicable to the target API; (D) API management system 310 looking at related records to determine the most used parts of APIs, which may or may not be used together with the parts of the target API; (E) API management system 310 looking at other records to determine APIs associated with the target API and looking at information associated with the APIs to generate supplemental source code; (F) using a combination of methods disclosed herein except (A) and other automatic methods to provide a narrow-down list for the user to choose, or (G) using a combination of methods disclosed herein and other automatic methods to generate supplemental source code. API management system 310 would therefore be able to achieve a high degree of automation in assisting the users. In some embodiments, API management system 310 may have instructions stored in a memory or remotely in database 330 that optimizes the process of step 635 as a whole. Depending on a variety of factors, API management system 310 may choose some of the embodiments disclosed herein as part of step 635. For example, when a user of internal front end system 105 wants to work on an API of transportation system 107 and develop or test an application that uses data sent from devices 107A-107C, the user may want to create separate programs for each type of mobile devices 107A-107C so that the programs can work better with different types of data from the devices. In addition, the user may want to incorporate certain function related to SAT system 101 to improve the application. In such situation, API management system 310 may (A) determine from information associated with the target API of transportation system and records of using the target API that which parts of APIs of 107A-107C and SAT system 101 the user may need to access; (B) determine from access information of the target API and the associated APIs that the user has access; and (C) has determined based on instructions stored in a memory that the documentation, source code and supplemental source code generated do not exceed certain threshold as being too much for the user and are popular based on records of the APIs. Then API management system 310 may proceed to provide the user documentation, source code and supplemental source code associated with the target API of system 107 and APIs of devices 107A-107C and SAT system 101, without further asking the user to look up or select.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An application programming interface (API) management system for managing API information, the API management system comprising:
    at least one processor;
    an API database storing data associated with APIs; and
    at least one memory containing instructions that, when executed by the at least one processor, cause the processor to perform operations comprising:
        receiving, by an interface of the API management system, an API registration request and API data associated with an API, wherein the API data comprises access information, and wherein the access information identifies a group of entities permitted to access the API;
        generating documentation associated with the API based on the API registration request;
        generating, by the API management system, a rule set for generating code using the API based on the API registration request, wherein the API management system uses the rule set to generate code associated with the API when a user from among the group of entities is connected to the API; and
        storing, by the API management system, the generated documentation and the API data in the API database, wherein the API management system:
            connects a user device to the API data in response to a connection request; and
            generates base source code and supplemental source code by determining and selecting most used parts of the API data, wherein the most used parts of the API data is determined based on a review and assignment of weighted coefficient to related records wherein the API data was previously used.

2. The API management system of claim 1, wherein the API registration request and API data are received from a user device, wherein the user device uses the API.

3. The API management system of claim 1, wherein the API registration request and API data are received from a user device in a fulfillment optimization system for computing a promised delivery date for a product.

4. The API management system of claim 1, wherein the API data comprises at least one of: index information, identification information, permission level authorization information, introduction notes, rules, development and debugging notes, or a record of previous use of the API.

5. The API management system of claim 1, wherein the group of entities identified by the access information comprises at least one of: any user, any API, or any computer system.

6. The API management system of claim 1, wherein the group of entities identified by the access information comprises at least one of: a particular group of users, APIs, or computer systems given access; a particular group of users, APIs, or computer systems not given access; or an access criteria of receiving a connection request to connect to the API.

7. The API management system of claim 1, wherein the documentation is generated based on the API data.

8. The API management system of claim 7, wherein the operations further comprises:
    receiving an input from a user device;
    identifying the API as a target API of the input;
    in response to the input, performing at least one of: retrieving the documentation or generating the base source code associated with the target API; and
    providing the user device with the at least one of the documentation or the generated base source code.

9. The API management system of claim 8, wherein the operations further comprises:
    determining that the supplemental source code associated with at least one API different from the target API is responsive to the input; and
    generating the supplemental source code associated with the at least one API different from the target API, wherein the supplemental source code is added to the generated base source code.

10. The API management system of claim 8, wherein:
    the input includes at least one keyword; and
    the API is identified as the target API based on the at least one keyword.

11. The API management system of claim 8, wherein the API is identified as the target API based on a record of use of the API.

12. The API management system of claim 8, wherein the API is identified as the target API based on at least one of: a search history associated with the user device, selection history associated with the user device, or using history associated with the user device.

13. The API management system of claim 8, wherein the operations further comprises:
    providing a list of APIs to the user device, the list being based on the input and including the API;
    receiving a selection of the API from the user device, wherein the API is identified as the target API based on the received selection.

14. The API management system of claim 13, wherein the list of APIs is further based on popularities associated with the APIs.

15. The API management system of claim 1, wherein the operations further comprises receiving an API update request and additional API data.

16. The API management system of claim 15, wherein the operations further comprises updating at least the rule set or the documentation.

17. The API management system of claim 16, wherein the operations further comprises sending a notification to at least one computer system.

18. The API management system of claim 17, wherein the at least one computer system was identified as part of the group of entities permitted to access the API.

19. A method for managing application programming interface (API) information comprising:
    receiving an API registration request and API data associated with an API, wherein the API data comprises access information, and wherein the access information identifies a group of entities permitted to access the API;
    generating documentation associated with the API based on the API registration request;
    generating a rule set for generating code using the API based on the API registration request, wherein the rule set is used to generate code associated with the API when a user from among the group of entities is connected to the API; and storing the generated documentation and the API data in an API database, wherein the API database:
　connects a user device to the API data in response to a connection request; and
　generates base source code and supplemental source code by determining and selecting most used parts of the API data, wherein the most used parts of the API data is determined based on a review and assignment of weighted coefficient to related records wherein the API data was previously used.

20. An application programming interface (API) management system for managing API information, the API management system comprising:
　at least one processor;
　an API database storing data associated with APIs; and
　at least one memory containing instructions that, when executed by the at least one processor, cause the processor to perform operations comprising:
　　receiving, by an interface of the API management system, an API registration request and API data associated with an API, wherein the API data comprises access information, and wherein the access information identifies a group of entities permitted to access the API;
　　generating documentation associated with the API based on the API registration request;
　　generating, by the API management system, a rule set for generating code using the API based on the API registration request, wherein the API management system uses the rule set to generate code associated with the API when a user from among the group of entities is connected to the API;
　　storing, by the API management system, the generated documentation and the API data in the API database, wherein the API management system connects a user device to the API data in response to a connection request;
　　receiving an input from a user device;
　　determining that the user device is authorized to access the API;
　　based on determining that the user device is authorized to access the API, identifying the API as a target API of the input;
　　in response to the input, performing at least one of: retrieving the documentation or generating base source code associated with the target API;
　　generating supplemental source code by determining and selecting most used parts of the API data associated with the target API, wherein the supplemental source code is added to the generated base source code, and wherein the most used parts of the API data is determined based on a review and assignment of weighted coefficient to related records wherein the API data was previously used; and
　　providing the user device with the at least one of the documentation or the generated base source code.

* * * * *